United States Patent [19]
Franchi et al.

[11] 4,242,540
[45] Dec. 30, 1980

[54] AUTOMATIC TELEPHONE ANSWERING DEVICE INCLUDING A DISPLAY FOR DISPLAYING INDICATIONS OF THE VARIOUS OPERATING MODES OF THE DEVICE

[75] Inventors: Aldo Franchi, Saronno; Giuseppe Allerino, Milan, both of Italy

[73] Assignee: International Standard Electric Corporation, New York, N.Y.

[21] Appl. No.: 4,436

[22] Filed: Jan. 18, 1979

[51] Int. Cl.³ ............................................. H04M 1/64
[52] U.S. Cl. ..................................... 179/6 R; 360/31; 360/137
[58] Field of Search .... 179/6 R, 100.1 DR, 100.1 PS, 179/100.1 VC; 360/18, 19, 74.1, 74.2, 74.4, 79, 80, 72.1, 31, 137, 74.3; 364/900 MS File, 200 MS File; 340/326, 502, 504, 525, 674, 675

[56] References Cited

U.S. PATENT DOCUMENTS

| | | | |
|---|---|---|---|
| 2,946,852 | 7/1960 | Brown et al. | 179/6 R |
| 3,051,795 | 8/1962 | Roberts et al. | 179/100.1 DR |
| 3,155,950 | 11/1964 | Foster | 340/525 X |
| 3,772,473 | 11/1973 | Parham | 360/80 |
| 3,809,302 | 5/1974 | Malyon | 360/72.1 |
| 3,964,302 | 6/1976 | Gordon et al. | 340/525 X |
| 4,011,586 | 3/1977 | Pastor et al. | 360/31 |
| 4,014,039 | 3/1977 | Yasunaga | 360/72 |
| 4,066,349 | 1/1978 | Flint | 360/72.1 |
| 4,185,306 | 1/1980 | Dudley | 360/137 X |

Primary Examiner—Bernard Konick
Assistant Examiner—Donald E. McElheny, Jr.
Attorney, Agent, or Firm—John T. O'Halloran

[57] ABSTRACT

The present invention relates to telephone automatic answering devices and more particularly relates to a telephone answering device that includes a display unit that gives indications of possible malfunctions of the answering device as well as indications of the messages received.

18 Claims, 10 Drawing Figures

AUTOMATIC TELEPHONE ANSWERING DEVICE INCLUDING A DISPLAY FOR DISPLAYING INDICATIONS OF THE VARIOUS OPERATING MODES OF THE DEVICE

The present invention relates to improvements in and/or related to the telephonic automatic answering devices in general and, more particularly it relates to a multiple purpose electronic counter particularly for automatic telephonic answering devices.

As it is known a telephonic answering device is an apparatus which, as connected to a telephonic line, allows for the registering or recording, in the absence of an user, of coming calls for a subsequent reproduction or play back of the arrived calls by the user. These telephonic answering devices may be essentially classified in two types, depending on the time assigned to the messages by the calling party, i.e. fixed time answering devices and unlimitated time answering devices.

A telephonic answering device either of the fixed or unlimitated time is generally able to recording an announcement, i.e. a message to be transmitted to the calling party and which is indeed transmitted after a while from the dialing by the calling party of the telephonic number to which the answering device is associated. More specifically, in the fixed type of telephonic answering devices, in the announcement are also included, besides information of varying nature, the indication of the time available for the calling party to transmit his message and the indication of a performed recording of the message itself. In the unlimitated time type of telephonic answering devices, naturally within the recording capability of the apparatus ranging from tens of minutes to several hours, there is lacking in the announcement mode an indication of the time available for a calling party and the apparatus automatically operates as some telephonic conditions occur such as, for example, a pause by the calling party exceeding a number of seconds or the detecting of exchange tones, polarity inversions or line transient phenomena. On many telephonic answering devices, either of the fixed or unlimitated time, a mechanical counter is also mounted, said mechanical counter being generally of the type used on conventional tape recording devices to indicate the sliding of the tape, i.e. how much tape is yet available or how much has been used for recording the received messages. In addition, on other telephonic answering devices, a pulse counter is also mounted, this latter indicating the number of the arrived calls thereby the user, as calls back, is able to know how many calls the answering device has received. These latter functions which, in the known telephonic answering devices are generally performed by mechanical means, are two useful characteristics and, as associated in a telephonic automatic answering device, improve both the operating reliability and the commercial value thereof.

However these two useful functions, in the known telephonic answering devices, are obtained by mechanical means and therefore the apparatus is cumbersome, of poor reliability and generally lacking of malfunction indications. In particular, in the known telephonic answering devices, the user, as calls back has to remember the arrived call number, and then again set the answering device in the automatic message receiving mode; obviously this represents a drawback in that the remembering of a day by day different number is very difficult.

Accordingly the main object of the present invention is to provide a new and improved type of automatic telephonic answering device in which the two aforesaid functions, i.e. that of indicating the sliding of the tape and that of pulse counter or arrived call indication are performed rather than by conventional mechanical indications by an electronic device effective to provide said information on a seven segment display unit.

Another object of the present invention is to provide an automatic telephonic answering device in which to the aforesaid two functions a third function is associated, i.e. that of a second counter also obtained in an electronic way by coding a seven segment and decimal point display unit.

Another object of the present invention is to provide an automatic telephonic answering device in which the need is obviated for the remembering by the user of the number of the messages received everyday by the answering device.

Another object of the present invention is to provide an automatic telephonic answering device effective to give on said seven segment display unit an indication that the answering device may be used as a normal telephone for placing or receiving calls.

Another object of the present invention is to provide an automatic telephonic answering device effective to give on said seven segment display unit an indication that the answering device is ready for recording an announcement.

Another object of the present invention is to provide an automatic telephonic answering device effective to give on said seven segment display unit an indication that the counter associated to said answering device is counting up.

Another object of the present invention is to provide an automatic telephonic answering device effective to give on said seven segment display unit an indication that a recording of an announcement may be started while said counter gives indication of elapsed time (in seconds).

Another object of the present invention is to provide an automatic telephonic answering device effective to give on said seven segment display unit an indication of announcement recording completed.

Another object of the present invention is to provide an automatic telephonic answering device effective to give on said seven segment display unit an indication that the answering device is in the announcement play back mode of operation.

Another object of the present invention is to provide an automatic telephonic answering device effective to give on said seven segment display unit an indication that the answering device is properly predisposed for automatic telephone answering and message recording.

Another object of the present invention is to provide an automatic telephonic answering device effective to give on said seven segment display unit an indication of possible operating malfunctions or incovenients such as, for example: (1) no announcement cartridge (2) announcement cartridge in reset (3) announcement cartridge faulty (4) no messagge cassette (5) ► ► or ◄ ◄ keys in an on state and the like.

Another object of the present invention is to provide an automatic telephonic answering device effective to give on said seven segment display unit an indication that an announcement being sent to an end caller and then his message recorded.

Another object of the present invention is to provide an automatic telephonic answering device effective to give on said seven segment display unit an indication that the answering device is ready to receive other calls.

Another object of the present invention is to provide an automatic telephonic answering device effective to give on said seven segment display unit an indication of the calls received so far.

Another object of the present invention is to provide an automatic telephonic answering device effective to give on said seven segment display unit an indication of possible malfunction of the answering device automatic answering mode of operation, such as for example: (1) MC full up (2) MC faulty (3) AC faulty (4) MC removed (5) AC removed (6) keys on ▶ ▶ ◀ ◀.

Another object of the present invention is to provide an automatic telephonic answering device effective to give on said seven segment display unit an indication that the message play back mode of operation has been selected after automatic telephone answering.

Another object of the present invention is to provide an automatic telephonic answering device effective to give on said seven segment display unit an indication of fast rewind, said indication also supplying information about the rewinding speed.

Another object of the present invention is to provide an automatic telephonic answering device effective to give on said seven segment display unit an indication that the answering device is in the message play back mode of operation.

Another object of the present invention is to provide an automatic telephonic answering device effective to give on said seven segment display unit an indication of message play back completed, said answering device being further able to automatically stop after the play back of the last received message.

Another object of the present invention is to provide an automatic telephonic answering device able to perform the aforesaid functions in an electronic way, by a minimum number of easily available components and in particular by using a minimum number of seven segment display elements, thereby the user may easily understand the operation mode of the answering device and moreover may quickly become familiar with the several described indications of the operating mode of said automatic answering device.

The aforesaid and other objects which will become more apparent thereinafter are achieved by an automatic telephonic answering device effective to operate according to multiple modes, comprising a keyboard assembly including a multiplicity of keys movable between raised and lowered positions to select desired operating modes of said plurality of operating modes of said automatic answering device, to said multiplicity of keys being operatively associated a corresponding multiplicity of electrical contacts, characterized in that it comprises a display unit of the seven segment element and decimal point type said seven segment elements and decimal points being individually energizable and disenergizable for the lighting and putting out of respective said seven segment elements and decimal points and drive circuit means effective to be triggered by said multiplicity of electrical contacts of said keys to cause predetermined said seven segment elements and decimal point to light and put out to visually indicate, by predetermined combinations of lighting and putting out states of said seven segment elements and decimal points, the operating mode of said answering device and possible malfunctions of said automatic answering device, said automatic answering device being further characterized in that said circuit means include reversible electronic counter means effective to trigger said seven segment elements and decimal points to provide a visual indication of the count of the calls received by said automatic answering device.

Advantageously said circuit means are effective to drive said counter means to cause said counter means to downwardly count during the message play back mode of operation in such a manner as to provide, after the play back of the last message, a 00 visual indication.

Further objects and advantages of the automatic telephonic answering device according to the present invention will become more evident from the following detailed description of an embodiment thereof, particularly relating to the aforesaid new functions thereby performed, illustrated as an example only in the accompanying drawings, where:

Figure 1A:
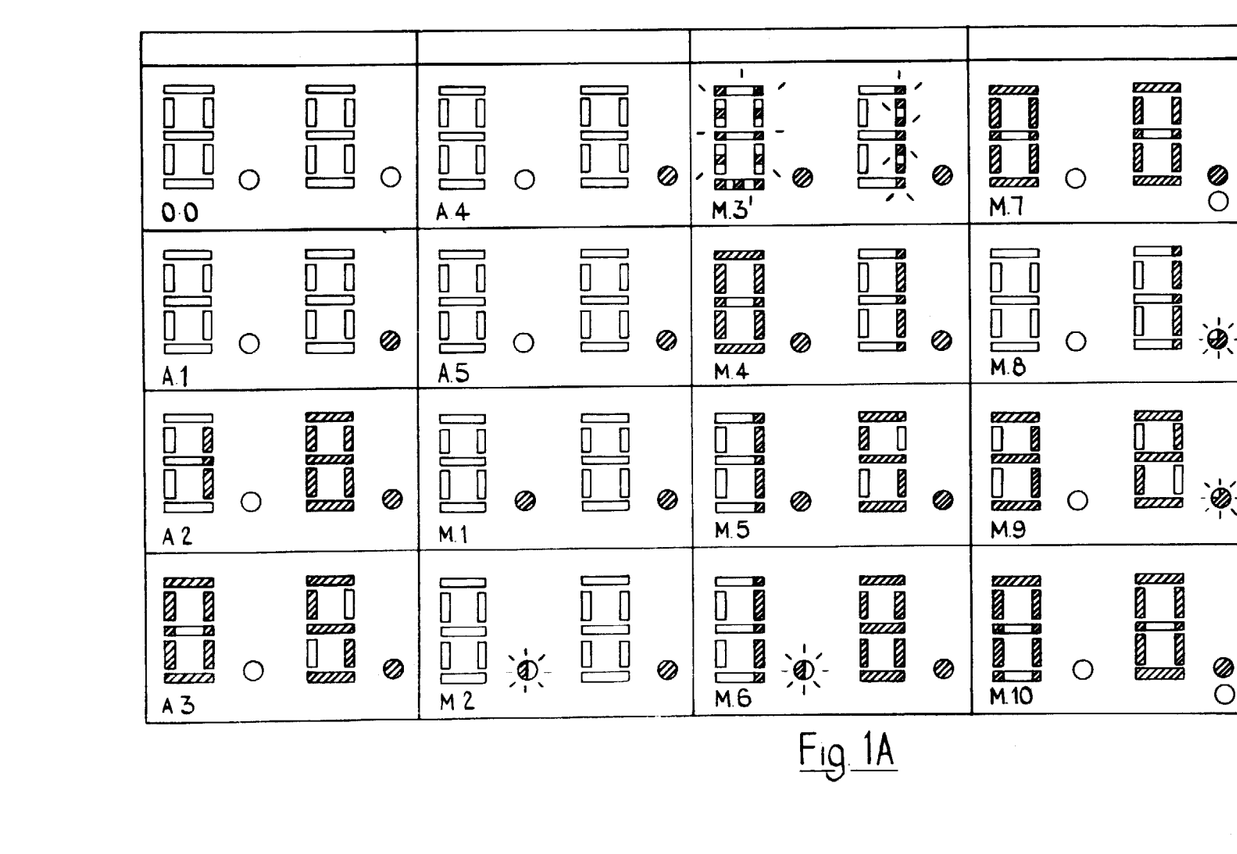
FIG. 1A illustrate the seven segment element and decimal point display unit associated to the automatic telephonic answering device according to the present invention, said display unit being illustrated with the components thereof in various on, off and flashing on conditions, said conditions indicating the several states or operating modes of the instant automatic telephonic answering device.
Figures 1B, 3, 8:
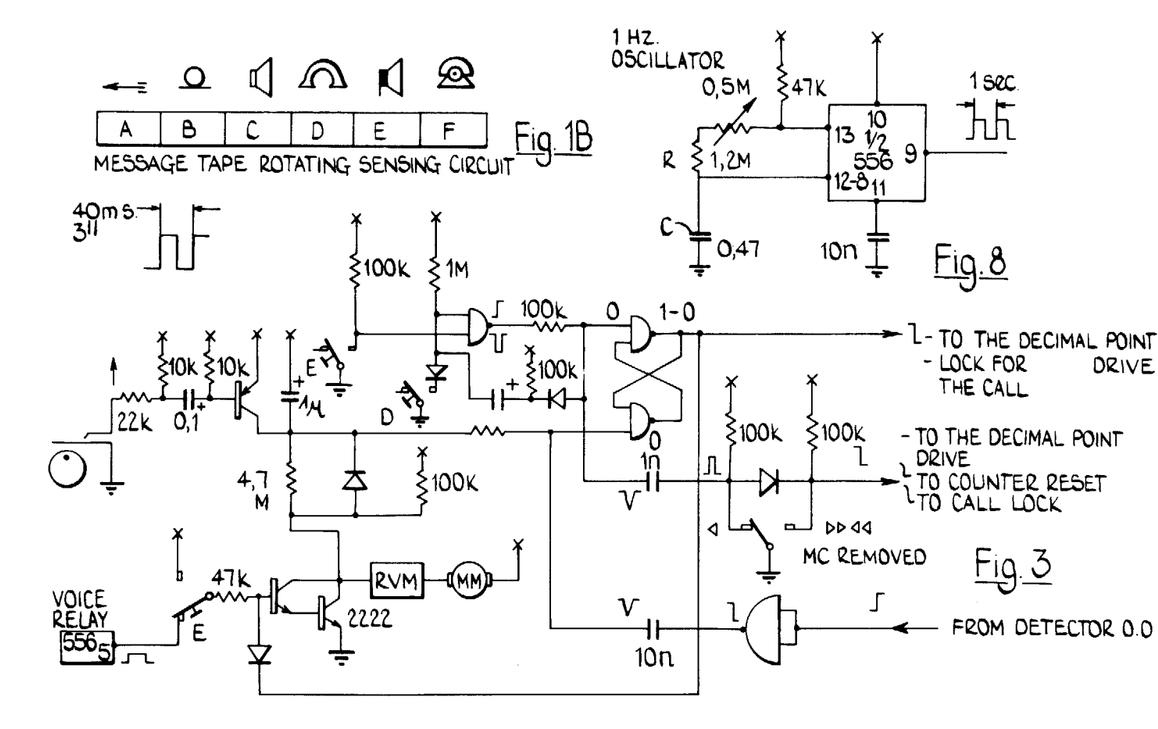
FIG. 1B illustrates the keyboard of the automatic telephonic answering device according to the present invention, comprising six keys indicated respectively by A,B,C,D,E and F above said keys the conventional symbols thereof being also represented.
FIG. 3 is a schematic diagram of the message tape rotating sensing circuit associated to the automatic telephonic answering device according to the present invention.
FIG. 8 illustrates a schematic diagram of a circuit for generating a fixed frequency of 1 Hz associated to the automatic telephonic answering device according to the present invention.

Referring now to the aforesaid figures, and in particular to FIGS. 1A and 1B, therein the display unit and the keyboard of the automatic telephonic answering device of the present invention are respectively illustrated. As it is shown, the display unit includes two seven segment elements, of conventional type, whereto two decimal points are associated, also effective to light and also of conventional type. As it will be described in more detail thereinafter, by means of a combination or coding of the lighting and/or putting out modes (on and off modes) of the seven segment elements and decimal points of the display unit of the instant automatic telephonic answering device it is possible to obtain an indication of a plurality of operating modes of the automatic telephonic answering device itself.

Referring to FIG. 1B the keyboard of the instant automatic telephonic answering device is shown. Said keyboard comprises six keys indicated respectively by A,B,C,D,E,F and above said keys, as aforesaid, the conventional symbols thereof have been represented indicating the function of the keys. More specifically the key A is for starting the announcement mechanics, and the recording of the TOP (final tone); the key B is for the recording of the announcements; the key C is for the play back of the announcements; the key D is for placing the automatic telephonic answering device in its automatic telephone answering and recording mode of operation; the key E is for the play back of the messages; and the key F is for placing the automatic telephonic answering device in a normal telephone mode of operation.

Thereinbelow the several functions of the instant automatic telephonic answering device will be described by specifically referring to the aforesaid FIGS. 1A and 1B and the circuits performing said functions. It should be noted that the electric diagrams not specifically illustrated in the following detailed description are submitted only as a completion and they will be clear for those skilled in the art. More specifically as the key F is pressed, the display unit is in the condition indicated in FIG. 1A by 0.0. With the key F is its pressed state, the contacts of the keys B-C-D-E are in a rest condition and in the position illustrated in the diagram of FIG. 5. The contacts of the keys B-C-E being open prevent the positive polarity (+) from reaching the terminal 14A (see FIG. 7) driving the lighting of the display unit through the decoders (intergrated circuits A-B of FIG. 7).

Figure 4:
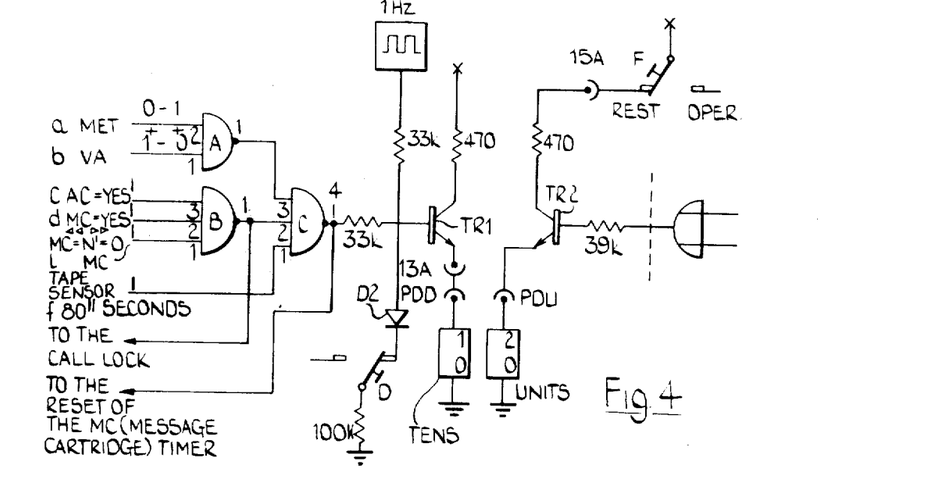
FIG. 4 illustrates a schematic diagram of a circuit for driving the seven segment element and decimal point display unit associated to the automatic telephonic answering device according to the present invention.
Figure 7:
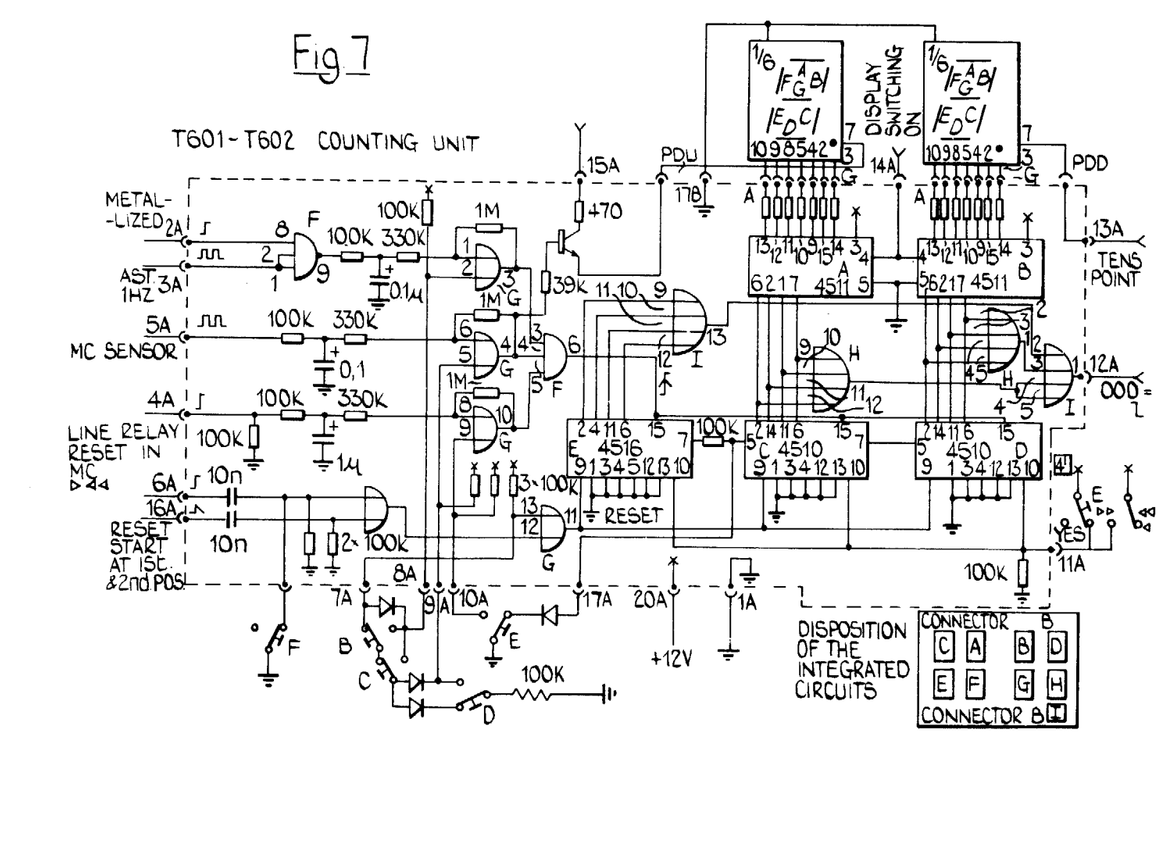
FIG. 7 illustrates a schematic diagram of the counter unit of the automatic telephonic answering device according to the present invention.

The contact D (FIG. 5) connects to ground the input 1 of the A gate and accordingly it causes the output 3 to go to a low level which, through the diode D1 holds or maintains to a low level the point P1. Due to the fact that all paths through which the positive polarity (+) are open or held at a low level, also the terminal 14A will be at a low level and hence the display unit will be in an off state. With respect to the switchin on of the decimal points, the driving is from TR1 and TR2 (FIGS. 4 and 7). The transistor TR1 is held locked by the key D connecting the base of the transistor TR1 to ground thus preventing positive polarity (+) from reaching the terminal 13A (FIGS. 4 and 7) and hence the decimal point. The key F (FIG. 4) is in its operating position since it has been pressed and the positive polarity is not able to reach the terminal 15A (FIGS. 4 and 7) and the terminal PDU (FIGS. 4 and 7) driving the switching on of the second decimal point.

From the above description it should be clear that, as the key F is pressed, the digits and the decimal point are in an off condition. In this condition, with the key F pressed the telephone mode of operation of the automatic telephonic answering device has been selected and said answering device may then be used as a normal telephone for sending or receiving calls. Obviously in this condition it is possible to perform actions such as the selection of other keys related to the answering and recording.

Figure 1C:
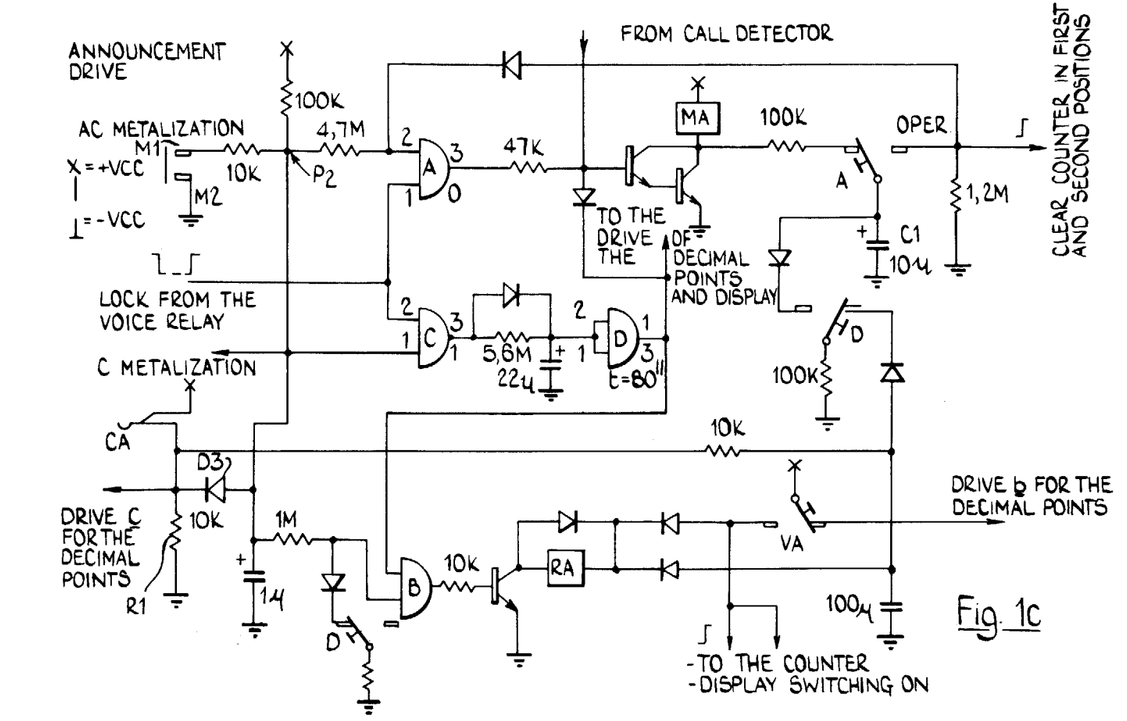
FIG. 1C illustrates a schematic diagram of a circuit for driving the announcement mechanics.

Suppose that the key B is pressed. Under this condition the display unit of the automatic telephonic recording device assumes the configuration indicated in FIG. 1A by the reference A.1. More specifically the elements of the display unit are all in an off state with the exception of the right decimal point which is lighting or in an on state. This configuration may correspond to the following three different cases:

(a) the most frequent case is that in which the announcement cartridge (not shown) is inserted, the contact CA being closed (FIG. 1C) and the metalized end portion of the magnetic tape short-circuits the contacts M1,M2 of FIG. 1C. The short-circuiting between M1,M2 places the input 1 of the gate B (FIG. 5) at a low level and accordingly also the output 4 of said gate will be low. Being the key B closed, this low level reaches the terminal 14A (FIGS. 5 and 7) holding in an off state the digits of the display unit.

(b) if the announcement cartridge is not inserted or disengaged, then the contact CA (FIG. 1C) is open and a low level is present on the resistor R1. Through the diode D3 this low level is transverred or sent to the input 1 of the gate B (FIG. 5) and accordingly to the output 4 thereof. The key B being closed, the terminal 14A (FIGS. 5-7) is low and the digits of the display unit are in an off state.

(c) if the announcement cartridge faults, then a safety timer operates, for example after about 80 seconds and, besides stopping the motor MA (FIG. 1C) it causes the display unit to switch off. In fact as the cartridge rotates, the metalized portion does not short-circuit the contacts M1 and M2 (FIG. 1C) and allows the positive polarity (+) to reach the input 1 of the C gate and then unlatch or free the timer. After about 80 seconds, the output 3 of the D gate goes to a low level and hence to the input 2 of the gate B (FIG. 5) and accordingly to the output 4. The key B being closed, the terminal 14A (FIGS. 5-7) is low and the digits of the display unit are off.

With respect to the decimal points it should be noted that the key D (FIG. 4), through the diode D2, maintains or holds at a low level the base of the transistor TR1 and the positive polarity (+) is not able to reach the terminal PDD (FIGS. 4-7). Therefore the left decimal point will be in an off state. The key F being at rest condition (FIG. 4) applies the positive polarity (+) to the transistor TR2. Since the base of this transistor TR2 is positive due to the fact that the output 10 of the G gate (FIG. 7) is high, the transistor TR2 is conductive and transfers the positive polarity (+) on PDU (FIGS. 4-7). Therefore the right decimal point will be lighting or on.

To resume, when the display unit configuration is that indicated by A.1, this means that the key B is pressed and that the announcement recording mode of operation has been selected for the automatic telephonic answering device. This latter is ready for recording the announcements. The possible actions are: off-hooking the telephone handset for recording the announcement, pressing the key→to start speak and 00 appearing. Again referring to FIG. 1A, the operating mode in which the display unit assumes the configuration indicated by A.2 will be described in which, for example, two segments of the first left seven segment element are lighting, the left decimal point being off, all segments of the second right seven segment elements being lighting or on and the right decimal point being also in an on state. Obviously the actual number of lighting segments will depend on the counter count which is now upwardly counting. In order to the display unit assume this configuration, the key B has to be pressed. By pressing the key B one may see the display unit to scan the seconds and, as aforesaid, the right decimal point in an on state, as shown in A.2. This occurs when the announcement cartridge tape does not present the metalized portion between the contacts M1 and M2 (FIG. 1C). The high level at the point P2 (FIG. 1C) is transferred to the terminal 2A of FIG. 7 and hence to the input 8 of the gate F. On the terminal 3A arrives the signal from the 1 Hz oscillator (the diagram of which is illustrated in FIG. 8) and it is coupled to the input 1-2 of the gate F. In this manner at the output 9 of the gate F will be also present the signal of the 1 Hz oscillator, said signal reaching the input 1 of the gate G. At the input 2 of the gate G the level is held low by the switching of the key B through the terminal 8A. Under these conditions, at the output 3 of the gate G the signal from the 1 Hz oscillator will be present and hence said signal will be also present also at the input 3 of the gate F. Since the inputs 4 and 5 of the gate F are normally at high level, the signal from the 1 Hz oscillator will be present at the output 6 and will be coupled or transferred to the inputs of the counters (integrated circuits C and D). With respect to the indications of the decimal points, they are as described with reference to A.1.

To resume, when the display unit has the configuration illustrated at A.2, the key B is pressed as at A.1 and the automatic telephonic answering device is resetting the announcement cartridge tape. The counter is counting up until reset is done, then automatically indication as A.1 appears. The possible actions are the same as A.1 upon reset.

The reference A.3 of FIG. 1A shows the display unit with the left seven segment element having all segments lighting except the cross segment, the left decimal point being off, whereas the right seven segment element is lighting with 5-shape and the right decimal point being also in an on state. In this configuration of the display unit the keys A and B are pressed. If, with the key B pressed (reference A.1) the key A is pressed, then the display unit will start to count seconds as shown by the reference A.3. The key A, by switching to its operating position (FIG. 1C), transfers the voltage of the charged capacitor C1 (for example having a capacity of 10 μF) to the input 2 of the AND gate A. At the output 3 of this AND gate A a high level appears driving the motor actuating the announcement cartridge. After few seconds the metalized tape portion disengages from the contacts M1 and M2 thereby freeing the point P2 which goes to a high steady state. Then the operation proceeds as described with respect to the reference A.2.

If, during the operation, the key A (FIG. 2) is released and then immediately pressed again, then the level of the output 3 of the gate A lowers for about 1 second and, through the input 3 of the gate B (FIG. 5), reaches the terminal 14A (FIGS. 5-7) causing the display unit to momentarily switch off. Under this condition therefore the key A is held pressed during the announcement recording. This recording is started as the display unit indicates 00, the announcement being recorded while the counter provides for an indication of the elapsed time in seconds. In this case the possible actions are the release and repress of the key A to insert an automatic top tone (TOP) or final tone ending the announcement. If desired one can record thanks announcement in the last seconds left. During the TOP tone the display unit is in an off state to indicate automatic insertion of it, no recording being then possible.

Referring again to FIG. 1A, the reference A.4 indicates still another configuration or coding of the display unit.

More specifically, in this configuration or coding, the left seven segment element of the display unit is off, and also off are the left decimal point and the right seven segment element of the display unit, whereas the right decimal point is lighting or on. In this state of the automatic telephonic answering device, the key B is pressed whereas the state of the key A is unimportant. In the normal use of the automatic telephonic answering devide, the key A is released after the recording of the announcement (but the operation does not vary even if the key A is pressed). As the tape, at the end thereof, presents between the contacts M1 and M2 the metalized portion (FIG. 1C), the point P2 goes to a low level and hence also the input 1 of the AND gate B (FIG. 5) goes to a low level. Therefore the display unit switches off as it is shown at A.4. To resume at A.4 the key B is pressed, the key A may be either released or pressed, thus indicating announcement recording completed. Obviously in this case the possible action is to start the announcement play back mode of operation.

At A.5 another configuration or coding of the display unit is illustrated corresponding to that of the reference A.4. However in this case the key C is pressed. As the key C is pressed, the display unit assumes precisely the configuration at A.5 in which the sole lighting element of the display unit is the right decimal point. In this case too, as described with respect to the reference A.1 the indication may correspond to three different situations. Being these cases analogous, reference is made to the description of A.1 provided that the key C is substituted for the key B. Also the cases described with respect to the references A.3 and A.4 are common to the keys B and C and hence the provided descriptions are to be considered as valid. A sole variation is that, whereas in the reference A.3 a momentarily (1 second) switching off has been provided of the display unit, upon operating the key A, in the instant case (key C pressed) this action is of no effect since, the key B being at a rest position (FIG. 2), it prevents the key A from operating.

At M.1 another possible configuration or coding of the display unit is shown. In this configuration the two decimal points are on whereas the two seven segment elements of the display unit are both in an off state. In this case the key D is pressed. As with the key D pressed, the display unit assumes the configuration illustrated at M1, this means that the answering device has been properly predisposed for automatic telephone answering and message recording. The seven segment elements forming the display are in an off state since (see FIG. 5) the output 3 of the AND gate A is low because the key D prior to pass to the operating position thereof set low the bistable device (AND gate A and 100 K resistor). The low output of the AND gate A causes the point P1 to a level zero, through the diode D1, thereby cancelling the effects of the 1 Hz signal and positive voltage arriving through the contact "ra" of the line relay. Being P1 at a low level and the contacts of the B-C-E keys being open, the terminal 14A (FIG. 7) is also at a low level and therefore the display unit is an off state.

Figure 2A:
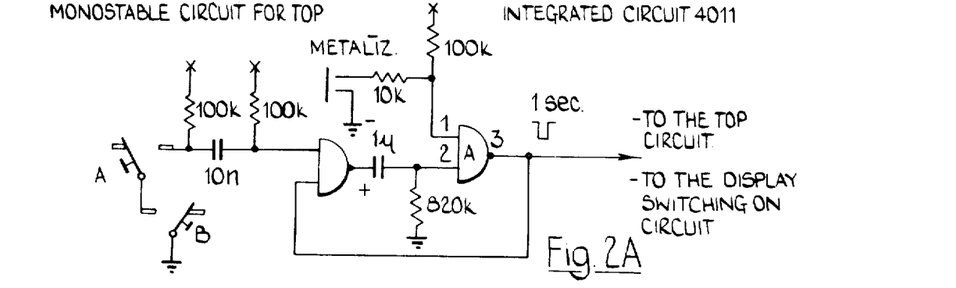
FIGS. 2A and 2B are respectively schematic diagrams of a one shot circuit and the call circuit associated to the automatic telephonic answering device according to the present invention.
Figure 2B:
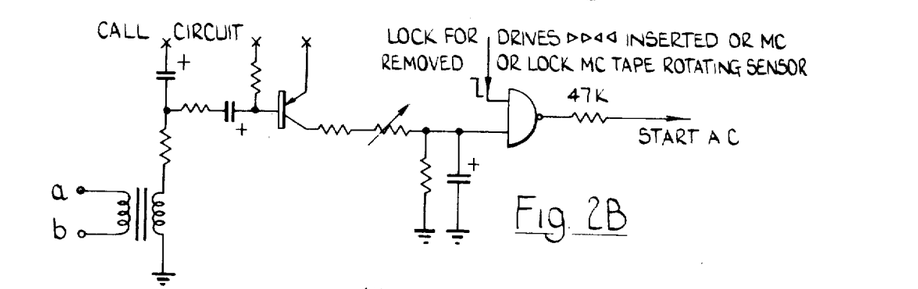

The decimal point status may be explained referring to the circuit illustrated in FIG. 4. The decimal point corresponding to the unit digit is lighting or on since the key F is at rest condition, the base of the transistor TR2 is at high level (the key E being open as shown in FIG. 2) and hence the transistor TR2 is conductive. The decimal point corresponding to the tens digit is on since, by pressing the key D, the base of the transistor TR1 is unlatched and the high output level of the AND gate C (FIG. 4) (the predisposition being proper) causes the transistor TR1 to conduct. Then, to resume, in the configuration M1 the key D is pressed. The automatic answering mode of operation has been selected i.e. the automatic telephonic answering device has been properly predisposed for automatic telephone answering and messagge recording. In the configuration M1 the display unit therefore provides for an indication of the reliability of the operation of the answering device, this latter being a peculiar characteristic of the automatic telephonic answering device according to the present invention.

Referring again to FIG. 1A, another possible configuration or coding of the display unit is that indicated by the reference M.2. In this configuration the left seven segment element of the display unit is off, the left decimal point is on and flashing, the seven segment right element of the display unit is off whereas the right decimal point is on, without flashing. Under this condition the key D is pressed. If, by pressing the key D, the display unit assumes the configuration indicated at M.2, this means that the automatic telephonic answering device has been not properly predisposed. The display digits and the decimal point corresponding to the units will be flashing in that owing to the erroneous predisposition the output of the AND gate C (FIG. 4) is at a low level. Thus to the base of the transistor TR1 (FIG. 4) will arrive the 1 Hz signal from the aforesaid oscillator. It should be noted that the cases of erroneous predisposition correspond to the inputs 1-2 of the NAND gate A, 1-2-3 of the AND gate B and 1 of the AND gate C. Obviously a return to normality of the involved input will cause the flashing to stop immediately and the case will be that of a proper predisposition as described at reference M.1. To resume, in the configuration illustrated in FIG. 1A by the reference M.2, the key D is pressed, and said configuration or coding and in particular the flashing decimal point indicate automatic answering not properly predisposed. In this case the possible inconvenients are: no announcement cartridge; announcement cartridge in reset; announcement cartridge faulty; no messagge cassette; ▶ ▶ or ◀ ◀ keys on. The possible actions to remove these malfunction conditions may be: insert the announcement cartridge; waiting until reset completed; change the announcement cartridge; insert the messagge cassette; reset said keys. From the above it should be noted that the automatic answering device of the present invention is also able to visually provide on a display unit an indication of an erroneous predisposition of said answering device in its automatic answering mode of operation. This is another peculiar characteristic of the automatic telephonic answering device according to the present invention.

Yet another configuration or coding that the display unit associated to the automatic answering device of the present invention is able to assume is that indicated in FIG. 1A by the reference M.3. In this configuration all segments of the left seven segment element are on and flashing, the left decimal point is on but does not flash, and some segments of the right seven segment element are on and flashing in such a way as to form a 3 digit. The right decimal point is on and does not flash. In this condition the key D is pressed. As the automatic telephonic answering device receives the first call, the display unit switches on and flashes and the counter moves up by an unit. In fact the switchin on is caused by the contact "ra" of the line relay (FIG. 5) which, switching by the rest position to the operating one, causes the bistable device formed by the AND gate A, resistor 100 K to change its output state thereby causing the output of said AND gate A to go to high level. Due to the fact that in this condition and through the diode D1, the point P1 is free, the signal from the 1 Hz oscillator is able to pass through and reach the terminal 14A (FIG. 7) thereby causing the display unit to flash. With respect to the counter (FIG. 7) it should be noted that, since the key D is at rest position, it enables the input 5 of the OR gate G and hence, as the contact "ra" (FIG. 5) switches, the terminal 4A (FIG. 7) goes to high level and hence, through the OR gate G and the AND gate F, arrives at the counter. To resume, in the described configuration, the key D is pressed, and the automatic telephonic answering device is automatically answering to the first incoming call in progress. The announcement is sent to the end caller and then his messagge is recorded. A possible action may be a possible monitoring of the call in progress by the use of the handset. This is another function peculiar to the instant automatic telephonic answering device and it allows for an user, as goes back, to note that the answering device is actually operating.

Yet another possible configuration of the display unit of the automatic telephonic answering device of the present invention is that indicated in FIG. 1A by the reference M4. In this configuration the left seven segment element is on or lighting in such a way as to form a not flashing 0. The left decimal point is on and not flashing the right seven segment element is lighting in such a way as to form a not flashing 1 and, finally, also the right decimal point is lighting and not flashing. As the display assumes this configuration the key D is pressed. As far as the answering device engage the telephonic line, the conditions are those described with respect to the reference M.3. At the end of the call, the contact "ra" returns to its rest position and, through the diode D3 and the 22K resistor it supplies the point P1 and causes said point P1 to go to high level. The terminal 14A (FIG. 7) holds high and the display unit holds on as shown at reference M.4. To resume, in the configuration of the reference M.4, the key D is pressed, the first messagge has been received and the automatic answering device is in a messagge waiting mode of operation. Moreover the automatic answering device is properly predisposed and ready to receive other calls. A possible action, in this operating mode, is the messagge play back upon pressing key E and after fast messagge tape rewind.

Yet another possible configuration or coding of the display unit of the automatic answering device of the present invention is that indicated by the reference M.5 in FIG. 1A. In this configuration, the left seven segment element is lighting in such a way as to form a not flashing 1, the left decimal point is also on and does not flash, the right seven segment element is lighting in such a way as to form a not flashing 5 and, finally, the right decimal point is also on and does not flash. In this configuration the key D is pressed, i.e. the automatic answering mode of operation has been selected. The operation of the automatic answering device proceeds as described with respect to the configurations M3–M4 and each time a call is received, the counter will step up by one step. The incrementation of the counter may arrive at any digit between 00 and 99 and thus, for example, at the fifteenth call the counter will be as shown at M.5, acting as an indicator of the number of the so far received calls. In the known answering devices this latter function was obtained by mechanical counters. To resume, as the display unit indicates a number such as for example 15, as shown at M.5, this means that the automatic answering mode of operation has been selected, the display unit indicates the number of the calls received so far, and a possible action is to play back the received messages (15 in the example) upon pressing the key E and the fast tape rewinding key ▶ ▶.

Yet another possible configuration of the display unit of the automatic telephonic answering device of the present invention is that indicated in FIG. 1A by the reference M.6. In this configuration the left seven segment element is lighting in such a manner as to form a not flashing 1, the left decimal point is flashing, the right seven segment element is lighting in such a manner as to form a not flashing 8, and the right decimal point is also on and does not flash. In this condition the key D is pressed, and this means, as aforesaid, that the automatic answering mode of operation has been selected. If, during the operation with the key D pressed the decimal point corresponding to tens flashes this indicates a faulty condition or an anomalous condition in the automatic answering (for example one cartridge is removed). The criteria controlling this status are connected to the inputs 1-2-3 of the AND gate B of FIG. 4 and to the input 1 of the AND gate C, FIG. 4. It is sufficient that one of said inputs lowers to a low level to cause the output of the AND gate C to go to a zero level thereby allowing the 1 Hz oscillator to drive the base of the transistor TR1 and hence the decimal point. Obviously a return to normality of the involved input automatically resets the initial conditions. To resume, in the configuration M6, the key D is pressed, and the automatic answering device is in an anomalous condition in the automatic answering thereof. In this condition the automatic answering device does not answer any more calls because of:1) the messagge cassette is full up; (2) the messagge cassette is faulty; (3) the announcement cartridge is faulty; (4) the messagge cassette has been removed; (5) the announcement cartridge has been removed; (6) keys ▶ ▶ ◀ ◀ on. As the user sees the display unit of his automatic answering device as shown at M6, he may perform the following possible actions: (1) change the messagge cassette or go to play back of the messagges upon pressing the key E; (2) change the messagge cassette; (3) change the announcement cartridge; (4) reinsert the messagge cassette; (5) reinsert the announcement cartridge; (6) place the ▶ ▶ ◀ ◀ keys in off position.

Yet another configuration that the display unit of the automatic telephonic answering device may assume is that indicated in FIG. 1A by the reference M7. If, upon operating as provided at M3-M4-M5, the key E is pressed, then the display unit will assume this configuration. The display is on since the key E contact (FIG. 5) directly supplies the terminal 14A. The tens point is off since the key D contact (FIG. 4) returning to a rest position connects to ground the base of the transistor TR1 through the diode D2. The units point may be either on or off depending on the messagge tape rotating sensor which may be open or closed, the scheme of said sensor being illustrated in FIG. 3. In fact it is connected to the terminal 54 (FIG. 7) and drives the transistor TR2 through the OR gate G enabled by the messagge play back key E.

A last consideration is to be made with respect to the counter reset which occurs during the passing from the condition in which the key D is pressed to that in which the message play back key E is pressed. During this step there is a time in which the key D is at an intermediate position between the rest and operating positions. At this time a high level at the input 13 of the OR gate clears the counters. Then, to resume, in the configuration M7 the messagge play back mode of operation has been selected, by pressing the key E, after automatic telephonic answering from the M5 situation. In this case, the counter from message indication (i.e. 15) resets to 00 upon selection of the message play back key E. This is another peculiar characteristic of the present invention in that, in the message play back mode of operation, it is not necessary for an user to remember a difficult number corresponding to the number of the received messages to be plaied back. Under this condition a possible action is to start fast tape rewinding before message play back.

Yet another configuration that the display unit associated to the automatic telephonic answering device of the present invention may assume is that illustrated in FIG. 1A by the reference M8. If, after pressing the message play back key E, the lever ▶ ▶ is operated, said lever being a common member in all types of recorders, then the units dot or decimal point will flash and simultaneously the the display unit will count the tape revolutions.

In fact the tape rotating sensor, by alternatively opening and closing, drives the base of the transistor TR2 (FIG. 7) through the OR gate G as enabled by the key E. Said sensor also drives the counter through the AND gate F and for each revolution of the tape disk, the count is incremented by one unit. During this step the counters count up since the terminal 11A (FIG. 7) is at high level (position ▶ ▶ and message play back key E at operating position).

To resume, in the configuration M8 of the display unit, the message play back key E is pressed and is also pressed the fast rewinding key ▶ ▶ . During fast rewinding the counter counts-up and the first decimal point or dot flashes with a rate related to the tape speed of mouvement. A possible action is to wait until counter stops (i.e. 32). The automatic telephonic answering device is now ready for automatic play-back of messages upon ▶ ▶ key back to idle state.

Yet another possible configuration that the display unit of the automatic telephonic answering device may assume is that indicated in FIG. 1A by the reference M.9 As shown the left seven segment element is lighting in such a manner as to form, for example, a 3, the left decimal point is off, the right seven segment element is lighting in such a way as to form a not flashing 2 and the right decimal point is flashing. As the message tape has been completely rewound, the lever ▶ ▶ is returned to position and the mechanics will resume normal speed. The units decimal point operates in the manner described for the reference M8 and the counter will decount by one unit for each revolution of the message tape disk. This counting down of the counter depends on the fact that the lever ▶ ▶ has been returned to normal position and that on the terminal 11A (FIG. 7) is now present a low level. To resume, in the configuration indicated by the reference M9, the automatic telephonic answering device is operating in the message play back mode, the key E being pressed. The counter decounts while the automatic answering device plays back messages and then, arrived to the last message (counter indication 00), it stops. As aforesaid this is a true peculiar characteristic of the automatic telephonic answering device of the present invention in that the user knows that as the counter indicates 00 then all messages have been played back. In this case the electronic counter of the automatic answering device of the present invention operates in a mode that is "opposed" to that of the mechanical counters of the know answering devices. Due to this indication 00 the user has not to remember difficult numbers related to the received calls and, on the contrary, he knows that as the counter indicates 00 then all messages have been plaied back. Possible actions to stop play back may be: (1) press the key F; (2) extract the message cassette; (3) select the ► ► or ◄ ◄ keys to advance to other messages or repeat.

Finally yet another configuration that the display unit of the automatic telephonic answering device may assume is that indicated in FIG. 1A by the reference M10. This configuration may occur when the message play back key E is pressed. If during an operation like that described with respect to M9 the counters reach 0, then the terminal 12A (FIG. 7) will go to low level and will automatically stop the answering device and hence the counting. In fact at the output of each counter (E-C-D FIG. 7) a respective OR gate is connected which changes its output level when all inputs thereof are 0. The outputs of the three gates are coupled to the inputs 2-3-4-5 of the OR gate I and then coupled to the terminal 12A. At the stop the right decimal dot will in turn stop flashing. It should be noted that said decimal dot or point may stop either in an on or off condition in that this depends on the position of the tape rotating sensor, as described with respect to the reference M7. The left decimal point is off. To resume in the configuration indicated at M.10, the message play back key E is pressed, and the message play back has been completed. All latest received messages have been played back, and automatic stop occurs. Possible actions to continue message tape play back are:1) press key F and then press again key E; 2) use the ► ► or ◄ ◄ keys; 3) extract the messagge cassette and insert again.

From the above description it should be clear that the present invention provides an automatic telephonic answering device which, due to the cooperation with a very simple display unit comprising a very reduced number of components, is able to give indications about a plurality of functions related to the particular operation performed by the answering device itself. Moreover the display unit, driven by the described and illustrated circuits is able to give also indications of possible malfunctions of the answering device. In addition the automatic telephonic answering device according to the present invention is provided with a new type of electronic counter which decounts giving an indication 00 at the completion of the messagge play back thereby an user has not to remember difficult numbers related to the arrived and played back calls.

Thus the invention provides an automatic telephonic answering device relying on the latest electronic technology, which is particularly reliable in operation, revoluzionizes the field of the known answering devices and is able to give a number of indications of useful functions.

While the invention has been described with reference to a specific embodiment thereof, it should be pointed out that this description is only illustrative and not limitative of the scope of the invention. In particular the circuitry and the coding illustrated in the accompanying drawings are only indicative, said circuitry being susceptible to several modifications and variations falling within the normal capabilities of those skilled in the art.

In particular many components may be realized in integrated form or by integrated circuits equivalent to those specifically indicated, or the circuitry may assume other arrangements performing the same functions. Therefore the Applicant aims to protect the plurality of functions indicative of the operation or malfunctions of the answering device made by the specific circuitry and coding illustrated.

Accordingly it should be clear that the invention is susceptible to several modifications and variations all falling within its spirit and scope as defined by the accompanying claims.

We claim:

1. An automatic telephonic answering device effective to operate according to multiple modes having a keyboard assembly including a multiplicity of keys movable between raised and lowered positions to select desired operating modes of said plurality of operating modes of said automatic telephonic answering device said multiplicity of keys being coupled to a corresponding multiplicity of electrical contacts comprising in combination a display unit of the seven segment element and decimal point type, said seven segment elements and decimal points being individually energizable and de-energizable for the energizing and de-energizing of respective seven segment elements and decimal points, drive circuit means effective to be actuated by said multiplicity of electrical contacts of said keys to cause predetermined ones of said seven segment elements and decimal points to visually indicate, by predetermined combinations of said seven segment elements and decimal points, the selected operating mode of said answering device and reversible electronic counter means effective to trigger said seven segment elements and decimal points to provide a visual indication of the count of the calls received by said automatic answering device.

2. An automatic telephonic answering device according to claim 1, characterized in that a first key (A) of said multiplicity of keys is for starting the mechanics of the announcements/recording of a final tone (Top), a second key (B) of said multiplicity of keys is for recording the announcements, a third key (C) of said multiplicity of keys is for the play back of the announcements, a fourth key (D) of said multiplicity of keys is for placing the automatic telephonic answering device in its automatic telephone answering and recording mode of operation, a fifth key (E) is for the play back of the messages and a sixth key (F) is for placing the automatic telephonic answering device in the telephone mode of operation thereof.

3. An automatic telephonic answering device according to claim 2, wherein in one of said operating modes selected by pressing said sixth key (F), said seven segment elements and decimal points are in an off state, said contacts of said second (B), third (C), fourth (D) and fifth (E) keys being at rest condition, said second (B), third (C) and fifth (E) key contacts being in an opening position, thereby preventing triggering positive polarity (+) from reaching the terminal (14A-FIG. 7) driving the lighting of said display unit, said fourth key contact (D, FIG. 5) connecting to ground one of the inputs (1) of first AND gate means (A-FIG. 5) to hold, through first unidirectional means (D1), at a low level a predetermined point (P1) of said circuit means said circuit means including a first and second transistors (TR1-TR2, FIGS. 4 and 7) effective to drive the lighting and putting out of said decimal points, said first transistor (TR1) being held in an off state by said fourth key (D) connecting the base of said first transistor (TR1) to ground thereby preventing said positive polarity (+) from reaching a terminal (13A, FIGS. 4 and 7) for lighting one of said decimal points, and one of said keys (F, FIG. 4) being in an operating position and preventing said positive polarity (+) from reaching a terminal (15A-FIGS. 4 and 7) of said circuit means and a terminal (PDU-FIGS. 4 and 7) of said circuit means driving the lighting of said second decimal point.

4. An automatic telephonic answering device according to claim 2, wherein in one of said operating modes selected by pressing said second key (B), said seven segment elements are in an off state, one of said decimal points being in an off state, the other of said decimal points being in an on state, this arrangement or configuration corresponding to the following cases: (a) the announcement cartridge is inserted in said automatic telephonic answering device, a contact of said circuit means being closed (CA FIG. 1) and a metalized portion of the magnetic tape of said announcement cartrige short-circuiting respective contacts (M1–M2, FIG. 1) of said circuit means, the short-circuiting between said contacts (M1 and M2) of said circuit means placing at a low level one input of second AND gate means (B-FIG. 5) and hence causing the output of said second AND gate means to go to a low level, said low level, due to the closing of said second key (B) reaching said terminal (14A, FIGS. 5 and 7) and holding in an off state the seven segment of said display unit; b) the announcement cartrige being disengaged, said contact (CA-FIG. 1) being open, on first resistance means (R1) of said circuit means being present a low level, and through further unidirectional means (D3) said low level being sent to said one input of said second AND gate means (B-FIG. 5) and to the output of said second AND gate means (B-FIG. 5) and, with the second key (B) in a closing position, said terminal (14A, FIG. 5-7) being low and the seven segment elements of said display unit being in an off state; (c) with the announcement cartridge in a malfunction condition, safety timer means associated to said circuit means operating after a pretermined period of time (80 seconds) to stop the motor means associated to said automatic telephonic answering device and switch off said display unit, with the cartridge rotating said metalized portion being not short-circuiting said contacts (M1–M2) thereby allowing said positive (+) polarity to reach one input of third AND gate means (C, FIG. 1C) and free said timer means after said delay time, one output of fourth AND gate means (D-FIG. 1C) going to a low level and respectively to an input of said second AND gate means (B-FIG. 5) and to the output (4) of said second AND means and, being said second key (B) closed, said terminal (14A-FIGS. 5, 7) being low and the seven segment elements of said display unit being in an off state and said fourth key (D, FIG. 4) through said second unidirectional means (D2) holding at a low level the base of said first transistor (TR1) and said positive polarity (+) being prevented from reaching a terminal (PDD, FIGS. 4 and 7) for triggering one of said decimal points, and said decimal point being in an off state and said sixth key being in a rest condition and supplying said positive polarity (+) to said second transistor (TR2), the base of said second transistor (TR2) being rendered positive by the output of fifth gate means (G-FIG. 7), said second transistor (TR2) being then in a conductive state and transferring said positive polarity (+) to a terminal (PDU, FIGS. 4 and 7) for lighting or switching to the on state one of said decimal points.

5. An automatic telephonic answering device according to claim 1, wherein in one of said operating modes selected by pressing said second key (B) the seven segment elements of said display unit scan the seconds and one of said decimal points is in an on state, in this operating mode said metalized portion of the announcement cartridge being disengaged from said contacts (M1, M2), the high level at a point (P2, FIG. 1) of said circuit means being transferred to a terminal (2A, FIG. 7) thereof and from said terminal (2A) to one input (8) of sixth gate means (F), on another terminal (3A) of said circuit means arriving the signal of oscillating means (1Hz) and said signal being transferred to a respective input (1-2) of said sixth gate means (F, FIG. 7), on the output (9) of said sixth gate means (F) being present the signal of said oscillating means (1Hz) reaching one input (1) of said further gate means (G), the level being held low by the switching of said second key (B) through a terminal (8A) of said circuit means, and at the output (3) of said gate means (G) being present the signal of said oscillating means (1Hz) and said signal being then also present at the input (3) of said gate means (F), and the inputs (4 and 5) of said gate means (F) being normally at a high level, said signal of said oscillating means (1Hz) being present at the output (6) and being transferred to the inputs of respective counter means (integrated circuits C and D, FIG. 7), in this operating mode the base of said first transistor (TR1) being at a low level and said positive polarity (+) being prevented from reaching said terminal (PDD, FIGS. 4 and 7) for lighting or switching on one of said decimal points, and said second transistor (TR2) being in a conductive state and transferring said positive polarity (+) to said terminal (PDU-FIGS. 4-7), thereby switching on the other said decimal point.

Figure 5:
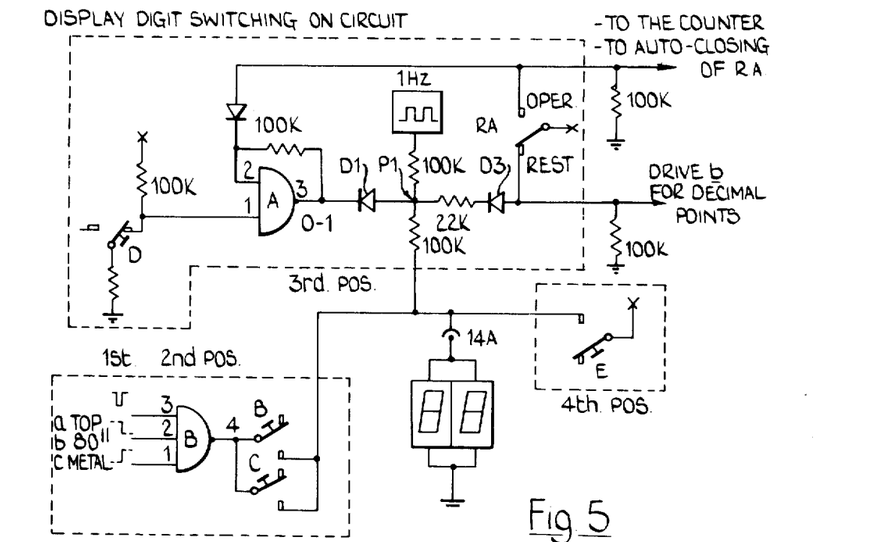
FIG. 5 illustrates a schematic diagram of a circuit for driving the lighting of the several digits of the display unit associated to the automatic telephonic answering device according to the present invention.
Figure 6:
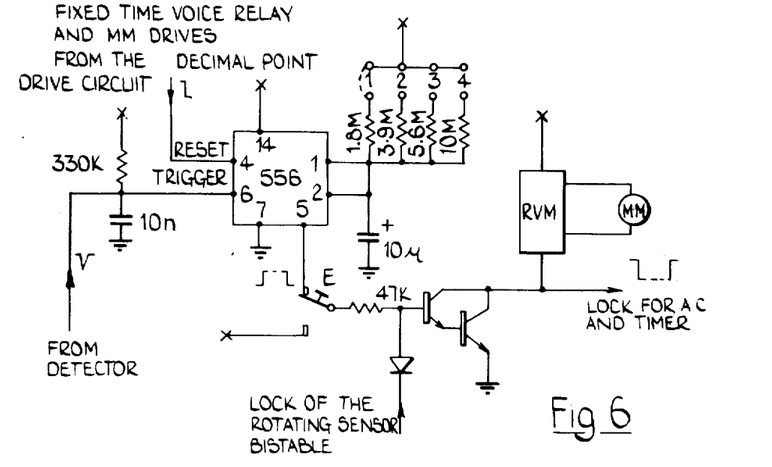
FIG. 6 illustrates a schematic diagram of a fixed time voice relay and controls of the automatic telephonic answering device according to the present invention.

6. An automatic telephonic answering device according to claim 1, wherein in one of said operating modes with said first (A) and second (B) keys pressed, the seven segment elements of said display unit start to count the seconds, said first key (A) switching to an operating position (FIG. 1) thereby transferring the voltage at the ends of capacitor means to the input (2) of gate means (A), at the output (3) of said gate means (A) being present a high level effective to drive the motor means of said automatic telephonic answering device and start the moving of said announcement cartridge and, after a predetermined period of time, said tape metalized portion disengaging said contacts (M1-M2) and freeing said point (P2) thereby this latter goes to a steady high level state and, when in this operating mode, said first key (A, FIG. 2) is released and immediately pressed again, the level at said output (3) of said gate means (A) lowering for a predetermined time (about 1 second) and, through an input (3) of gate means (B; FIG. 5), reaching said terminal (14A, FIGS. 5 and 7) thereby momentarily switching off said display unit.

7. An automatic telephonic answering device according to claim 1, wherein in one of said operating modes with said second key (B) pressed, said seven segment elements of said display unit are in an off state, one of said decimal points is in an off state and the other of said decimal points in an on state, said operating mode corresponding to said answering device properly predisposed for automatic telephone answering and message recording, in this operating mode said first key (A) being released after the recording of the announcement, and the magnetic tape being at the end thereof, presenting between said contacts (M1, M2) said metalized portion (FIG. 1), said point (P2) of said circuit means going to a low level and hence also the input (1) of said gate means (B, FIG. 5) going to a low level, and, through said second key (B) said terminal (14A FIGS. 5 and 7) also going to a low level, said seven segment elements of said display unit being in an off state and one of said decimal points being off and the other being on.

8. An automatic telephonic answering device according to claim 1, wherein in one of said operating modes selected by pressing said third key (C) the seven segment elements of said display unit are off, one of said decimal points being off, whereas the other of said decimal points is in an on state, the configuration of said display unit corresponding to the following three different cases:
  (a) the announcement cartridge being inserted, said contact (CA, FIG. 1) being closed, and said metalized portion of said magnetic tape short-circuiting said contacts (M1, M2), said short-circuiting between said contacts (M1, M2) placing said input (1) of said gate means (B, FIG. 5) at a low level and hence causing said output (4) of said gate means (B) to go low, and said third key (C) being closed, said low level reaching said terminal (14A, FIGS. 5 and 7) and holding the seven segment elements of said display unit at an off state;
  (b) the announcement cartridge being disengaged, said contact (CA, FIG. 1) being open and on said resistance means (R1) being present a low level, through said unidirectional conduction means (D3) said low level being transferred to said input (1) of said gate means (B, FIG. 5) and hence to said output (4) of said gate means (B) and, the third key (C) being closed, said terminal (14A) is low and the seven segment elements of said display unit are in an off state;
  (c) as the announcement cartridge is faulty, safety timer means operate after a predetermined period of time, to stop the motor of said automatic telephonic answering device and switch off said display unit and in this condition said metalized portion being disengaged from said contacts (M1, M2) and allowing said positive polarity (+) to reach one input (1) of said gate means (C) and free said timer means, after said predetermined period of time (80 seconds), the output of said gate means (D) going to a low level and to the input (2) of said gate means (B, FIG. 5) and to said output (4) thereof, and with said third key (C) closed, said terminal (14A, FIGS. 5 and 7) being low and the seven segment of said display unit being in an off state; and the base of said first transistor (TR1) being at a low level and said positive polarity (+) being prevented from reaching said terminal (PDD, FIGS. 4–7) and one of said decimal points being in an off state, and said second transistor being in a conductive state and transferring said positive polarity (+) to said terminal (PDU, FIGS. 4–7) to switch on said other decimal point.

9. An automatic telephonic answering device according to claim 1, wherein in one of said operating modes selected by pressing said fourth key (D) said seven segment elements of said display unit are in an off state, said two decimal points are both in an on state, thereby indicating a proper operation of said automatic telephonic answering device in the automatic answering mode, said seven segment elements being switched off by said output (3, FIG. 5) of said gate means (A, FIG. 5) at a low state, due to the operation of said fourth key (D) which, prior to reach the operating position thereof, causes the output of said gate (A) to go low, linking said point (P1), through said unidirectional means (D1), to a low level thereby cancelling the effects of said signal of said oscillating means (1 Hz) and said positive polarity (+) arriving through a contact (ra) of line relay means and, with said point (P1) at a low level and the contacts of said second (B), third (C), fifth (F) being open, said terminal being also at a low level, the base of said second transistor (TR2) with said sixth key (F) at rest condition being at high level, said transistor (TR2) being in a conductive state and one of said decimal points being in an on state, and also said first transistor (TR1) being in a conductive state and switching on said other decimal point.

10. An automatic telephonic answering device according to claim 1, wherein in one of said operating modes with said fourth key (D) pressed, the seven segment elements of said display unit are in an off state, one of said decimal points is alternatively energized and disenergized to flash, and the other of said decimal points is in a steady on state, said configuration of said display unit indicating an erroneous predisposition or setting of said automatic telephonic answering device, said one decimal point being alternatively energized and disenergized and flashing and at this end said circuit means causing the output of said gate means (C, FIG. 4) to go low and to the base of said first transistor (TR1) arriving said signal of said oscillating means (1Hz) and said circuit means being such that as the automatic telephonic answering device returns to a normal mode of operation, said pulsing or flashing is stopped and said display unit again indicates a properly predisposition of said automatic telephonic answering device.

11. An automatic telephonic answering device according to claim 1, wherein in one of said operating modes, with said fourth key (D) pressed, said seven segment elements of said display unit are alternatively energized and disenergized by said circuit means, thereby flashing, and said counter means associated to said circuit means stepping upwardly by an unit digit, said lighting or flashing being caused by said contact (ra) of said relay means (FIG. 5) which, by switching to the operating position, causes bistable means (gate A) to switch thereby bringing the output thereof to a high level, and freeing, through said unidirectional means (D1) said point (P1) in such a way as to allow said signal from said oscillating means (1 Hz) to pass through and reach said terminal (14A, FIG. 7) thereby causing said display unit to flash, and being said fourth key (D) in an operating position, enabling one input (5) of gate means (G) and, upon switching of said contact (ra, FIG. 5), a terminal of said circuit means (4A, FIG. 7) going to a high level and reaching, through gate means (G and F) said counter means.

12. An automatic telephonic answering device according to claim 1, wherein in one of said operating modes, with said fourth key (D) pressed and at the end of the comunication, the seven segment elements of said display unit are partially permanently lighting and both said decimal points are permanently lighting, said contact (ra, FIG. 5) of said relay means returning to the rest position and, through said unidirectional means (D3) and resistance means (22K) supplying said point (P1) forcing said point (P1) to a high level, and said terminal (14A) remaining at a high level to switch on said seven segment elements and said decimal points.

13. An automatic telephonic answering device according to claim 1, wherein in one of said operating modes with said fourth key (D) pressed, the seven segment elements of said display unit indicate the number of received calls, being permanently lighting, and said decimal points being also permanently lighting, and upon receiving each call said counter means advance by one step, the incrementating of said counter means being within a predetermined range (from 00 to 99).

14. An automatic telephonic answering device according to claim 1, wherein in one of said operating modes with said fourth key (D) pressed, said seven segment elements of said display unit are permanently lighting indicating a digit, and one of said decimal points flashes, whereas the other decimal point is permanently lighting, this configuration or coding of the display unit indicating a malfunction of the automatic telephonic answering device, this mode of operation being determined by said gate means (B and C, FIG. 4) of said circuit means, said gate means (C) driving said oscillating means (1 Hz) and thereby the base of said first transistor (TR1) and by this latter the switching on and off of said one decimal point, and said circuit means being further effective to automatically reset the initial conditions of said display unit upon returning to normal conditions of the respective inputs of said gate means (B and C, FIG. 4).

15. An automatic telephonic answering device according to claim 1, wherein in one of said operating modes, with said fifth key (E) pressed, the seven segment elements of said display unit are lighting, one of said decimal points is lighting whereas the other decimal point is on or off, in this configuration or coding of said display unit said contact of said fifth key (E) (FIG. 5) directly supplying said terminal (14A), said one decimal point being switched off by the contact of said fourth key (D) which, upon returning to the rest position, connects to ground the base of said first transistor (TR1) through said unidirectional means (D2), and said other decimal point being either on or off depending on the state of messagge cassette rotating sensing means, said sensing means being either in an open or closed condition, and being connected to a terminal (5A, FIG. 7) and driving said second transistor (TR2) through gate means (G) enabled by said fifth key (E).

16. An automatic telephonic answering device according to claim 1, wherein in one of said operating modes with said fifth key (E) pressed and upon actuating of lever means associated to said automatic telephonic answering device, the seven segment elements of said display unit are permanently lighting, one of said decimal points is off and the other decimal point is alternatively switched on and off, said seven segment elements counting the tape rotations, said tape rotating sensing means alternatively opening and closing thereby driving the base of said second transistor (TR2, FIG. 7) through said gate means (G) enabled by said fifth key (E) and said sensing means also driving said counter means through said gate (F) and, for each rotation of the tape disk, said counter means count being incremented by one unit, said counter means upwardly counting as driven by one terminal (11A) at high state of said circuit means.

17. An automatic telephonic answering device according to claim 1, wherein in one of said operating modes, with said fifth key (E) pressed, upon completing the rewinding of said tape and repositioning of said lever means, said seven segment elements of said display unit are permanently lighting, one of said decimal points is off and the other decimal point is alternatively switched on and off, said counter means counting downwardly by one unit for each rotation of the tape disk, in this condition on said terminal (11A, FIG. 7) of said circuit means being present a low level.

18. An automatic telephonic answering device according to claim 1, wherein in one of said operating modes, with said fifth key (E) pressed, as said counter means during the downwardly counting thereof reached zero, one said terminal (12A, FIG. 7) of said circuit means go to a low level, thereby automatically stopping the mechanics of said automatic telephonic answering device and stopping the counting, to the output of each said counter means (E-C-D) being connected a gate effective to change its output level when all inputs thereof are at a zero state, the outputs of said gates being coupled to respective inputs (2-3-4-5) of a further gate (I) and from said gate (I) being coupled to said terminal (12A) and, upon stopping, one of said decimal points stops flashing and is able of holding on or off depending on the position of said rotating sensing means.

* * * * *